United States Patent Office.

THOMAS A. EDISON, OF MENLO PARK, NEW JERSEY.

TREATING CARBONS FOR ELECTRIC LAMPS.

SPECIFICATION forming part of Letters Patent No. 239,148, dated March 22, 1881.

Application filed October 30, 1880. (No model.)

*To all whom it may concern:*

Be it known that I, THOMAS A. EDISON, of Menlo Park, in the county of Middlesex and State of New Jersey, have invented a new and useful Method of Treating Incandescing Conductors for Electric Lamps; and I do hereby declare that the following is a full and exact description of the same.

As has been fully explained in prior applications by me made and in Letters Patent granted to me, the best incandescing conductors for incandescent electric lamps are made by cutting or forming a suitable fibrous material into the proper shape, and then carbonizing the same by subjecting them to a very high temperature in closed flasks.

In the process of carbonization the element most difficult to eliminate is hydrogen, a large percentage of hydrogen remaining in the carbons, which cannot be removed, even at the highest temperature to which the flask can be brought without melting it.

The object of this invention is to furnish a method by which the hydrogen may be removed, which is accomplished as follows: Chlorine gas, or some gas which combines readily with hydrogen, but not with carbon, is passed through the flask while the same is heated. The chlorine unites with the hydrogen, insuring its removal.

If desired, the process of carbonization may take place in one flask and the carbons then removed to another flask, where the chlorination may be effected.

What I claim is—

The method of removing hydrogen from carbons, consisting in passing a stream of chlorine or equivalent gas through the flask containing the carbons heated to a high temperature, substantially as set forth.

This specification signed and witnessed this 15th day of October, 1880.

THOS. A. EDISON.

Witnesses:
 CHAS. BATCHELOR,
 WM. CARMAN.